Sept. 26, 1961     W. H. HARBOR     3,001,696
ADJUSTABLE CARRIAGE CONTROL STOP FOR ACCOUNTING MACHINES
Filed May 19, 1958     2 Sheets-Sheet 1
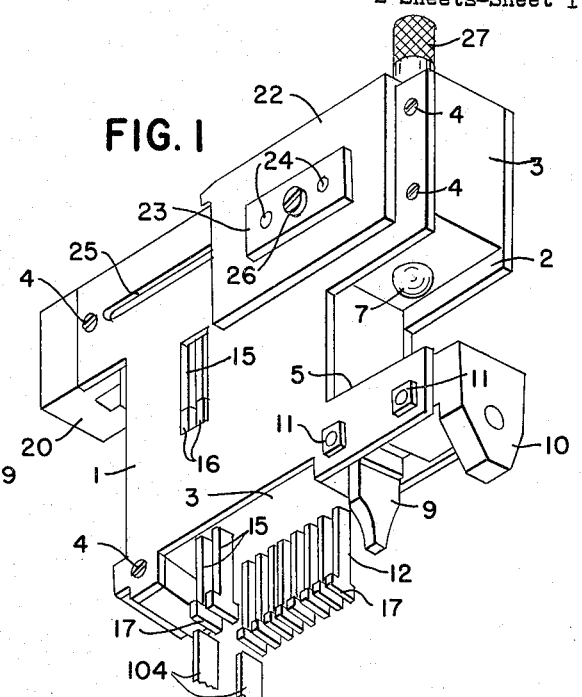
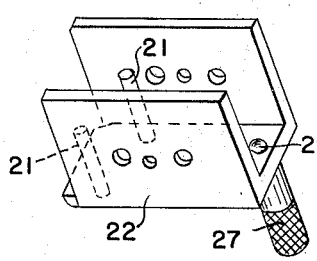
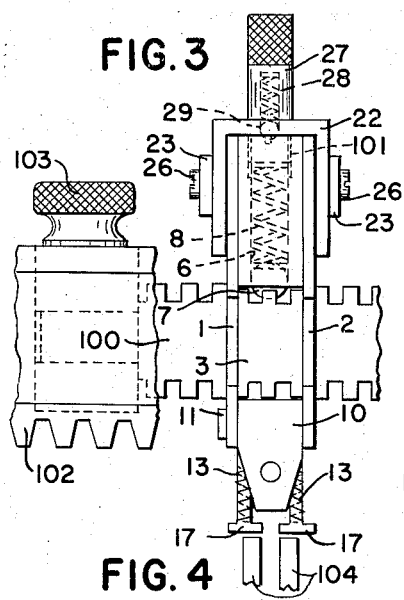
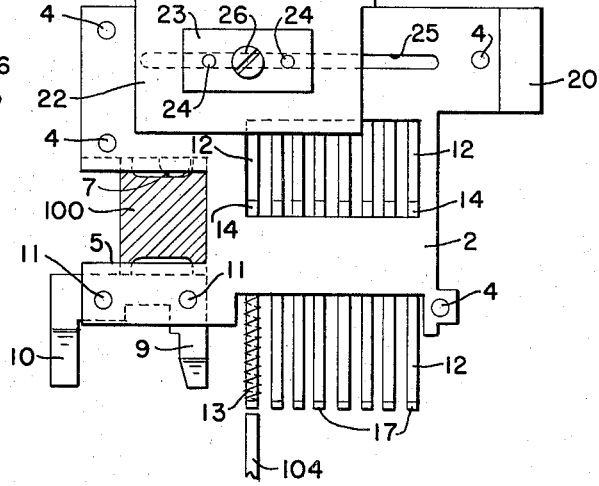
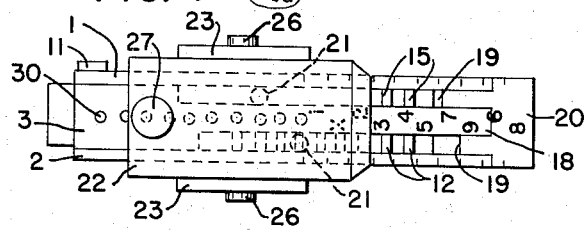
INVENTOR
WILLIAM HENRY HARBOR
HIS ATTORNEYS Sept. 26, 1961      W. H. HARBOR      3,001,696
ADJUSTABLE CARRIAGE CONTROL STOP FOR ACCOUNTING MACHINES
Filed May 19, 1958      2 Sheets-Sheet 2
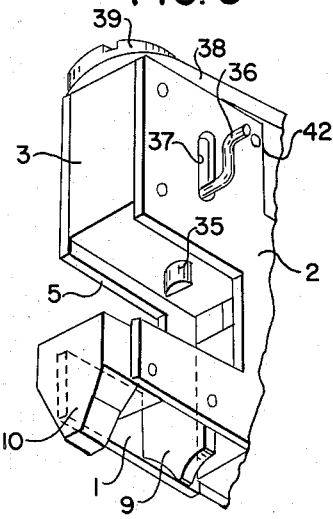
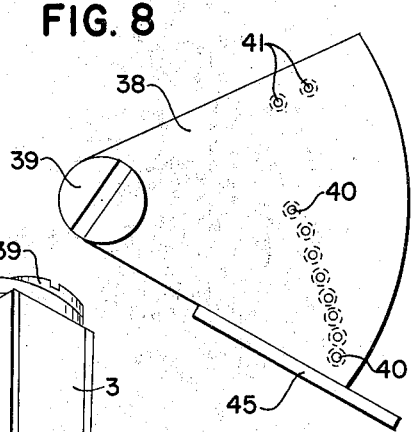
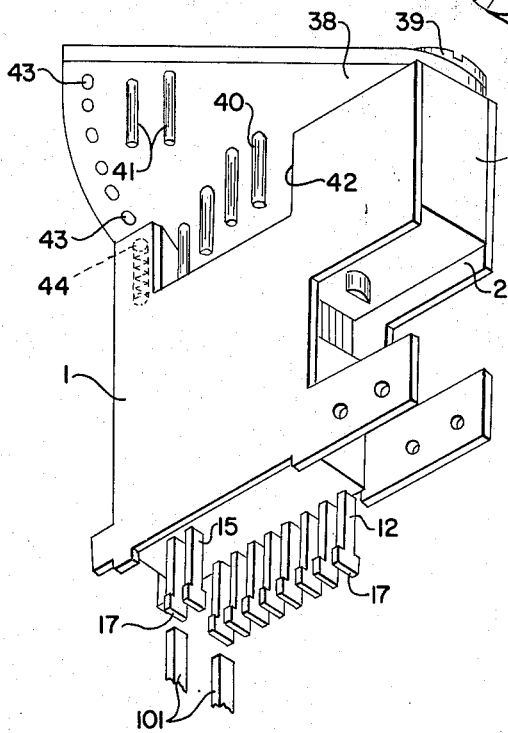
INVENTOR
WILLIAM HENRY HARBOR
BY
HIS ATTORNEYS United States Patent Office 3,001,696
Patented Sept. 26, 1961

3,001,696
ADJUSTABLE CARRIAGE CONTROL STOP FOR ACCOUNTING MACHINES
William Henry Harbor, Edgware, England, assignor to The National Cash Register Company, Dayton, Ohio, a corporation of Maryland
Filed May 19, 1958, Ser. No. 736,184
Claims priority, application Great Britain June 13, 1957
5 Claims. (Cl. 235—60.5)

The present invention relates to function control devices for attachment in predetermined columnar positions on the traveling record material carriages of accounting machines.

As is well known, carriage function control devices may be arranged to control the machine for various functions, such as, for example, addition, subtraction, total-taking, and sub-total-taking, and to simultaneously select a desired totalizer or totalizers for performing certain of said functions.

Various proposals have heretofore been made for enabling the functions of such function control devices to be varied under manual control, but such prior arrangements either enforce the control members for all totalizers to be simultaneously changed, or provide individually adjustable members for each totalizer, the function of which is to be changed within the control device assembly. Thus the previous proposals either lack selectivity of totalizer control or are cumbersome and slow in their adjustment.

It is accordingly a general object of the present invention to provide a carriage function control device which enables any one of a number of totalizers to be manually selected for a particular function in the columnar position in which the function control device is located, while at the same time providing a simple and rapidly adjustable common control member.

Another object of the invention is the provision of a function control device adapted to be detachably secured at any desired columnar position on a traveling carriage of an accounting machine, said device including a plurality of function control elements and a manually adjustable selecting device, adapted, according to its position of adjustment, to selectively render any predetermined one of the function control elements effective to control the machine for a corresponding function.

With these and incidental objects in view, the invention includes certain novel features of construction and combinations of parts, a preferred form or embodiment of which is hereinafter described with reference to the drawings which accompany and form a part of this specification.

In the drawings:

FIG. 1 is a right-hand perspective view of a preferred form of function control device.

FIG. 2 is a left side view of the device.

FIG. 3 is a rear view of the control device.

FIG. 4 is a plan view of the control device.

FIG. 5 is an inverted perspective view of the slidable selecting member, forming a part of the device.

FIG. 6 is a left-hand fragmentary perspective view of a modified form of function control device.

FIG. 7 is a right-hand perspective view of the modified form of function control device.

FIG. 8 is a top plan view of the segmental selecting plate for the modified form of function control device.

IN GENERAL

A device of the character outlined above is most useful in a machine of the type disclosed in Letters Patent of the United States No. 2,626,749, issued January 27, 1953, to Raymond A. Christian et al., which is equipped with carriage function control devices and with totalizer selecting and control keys. In a machine of this type, it is possible to have any one of a plurality of totalizers automatically selected for totalizing, under control of the carriage function control devices, the machine being automatically released for operation as the carriage tabulates into the columnar position in which an automatic total-taking control device is located. However, in such a case the totals taken from the various totalizers must be printed in different columnar positions, since it is not possible to automatically clear more than one totalizer in any one columnar position.

In machines of the type disclosed in the above-mentioned patent, it is possible for the totals from all the totalizers to be printed in one and the same column by successively depressing their selecting keys in conjunction with a total-taking control key, but such a procedure is very cumbersome and slow. With the arrangement of the present invention, however, the totalizers may be selected rapidly for total-taking all in one and the same column of the record material, by a simple manual adjustment of a single control member.

The proposed adjustable control device is even more valuable for use in a machine of the type disclosed in United States patent application Serial No. 466,292, filed November 2, 1954, now Patent No. 2,930,523, by Raymond A. Christian et al., which, like the machine referred to above, is equipped with a plurality of totalizers, but is provided with manually-operable control keys for only one of said totalizers, so that the functions of the remaining totalizers must necessarily be controlled automatically by the traveling carriage function control devices in preselected columnar positions of said traveling carriage. In a machine of this type, it is normally impossible to record the totals from all of the totalizers in one columnar position of the traveling carriage and record material, but the present invention enables this to be done easily and conveniently.

Although, in the following description, reference is made only to total-taking control, it is obvious that the device may be adapted for any other kind of function control and that, moreover, the function performed need not necessarily be the same for all the totalizers selected, but the control devices may be adapted to perform the same function by groups, or to perform different functions individually.

By way of example only, the invention will be described as applying to a machine of the type disclosed in United States Patent No. 2,626,749, referred to before, but said invention is equally applicable to any machine in which the amount of sensing movement of a sensing or selecting mechanism determines the nature of the machine function to be performed.

Two embodiments of the invention are disclosed herein, the first or preferred form of which relates to an arrangement wherein the function control device exerts its control over a series of sensing fingers, through the medium of a positionable slide mounted on the top surface of said device, and the modified form of which relates to an arrangement wherein the function control device exerts its control over the sensing fingers through the medium of a rockable plate mounted on the top surface of said device.

DESCRIPTION

Preferred form

The preferred form of carriage function control device comprises a right side plate 1 (FIGS. 1, 3, and 4) and a left side plate 2, which are secured to a spacing block 3, by means of rivets or screws (FIGS. 1 and 2). The rear ends of the side plates 1 and 2 have U-shaped cut-out portions 5, by means of which they can be detachably mounted on the usual H-shaped stop or program bar 100 (FIGS. 2 and 3), which is removably mounted on the front of an escapement bar 102 of the traveling carriage. It will be seen by referring to FIG. 1 that the upper and lower arms of the U-shaped opening 5, in each of the side plates 1 and 2, extend below and above corresponding cut-out surfaces in the spacing block 3, so as to form teeth which are engageable with corresponding teeth in the upper and lower surfaces of the program bar 100 (FIG. 3). The block 3 has a boring 6 arranged to receive a ball 7 and a corresponding tension spring 8, said boring being restricted at its lower end so that the ball 7 will extend only part-way into the opening formed in said block for the program bar 100. The upper end of the boring is threaded to receive a screw stud 101, by means of which the spring 8 may be tensioned, and said spring and the ball 7 retained in said boring. When the function control device is slid onto the bar 100 (FIGS. 2 and 3) in the desired columnar position, the spring-pressed ball 7 automatically rides over said bar and engages the channel formed in the upper edge thereof, so as to hold the device securely in place on said bar 100.

The lower rearwardly-extending arms of the side plates 1 and 2 form supports to receive a motor-bar-unlocking lug 9 (FIGS. 1 and 2) and a tabulation control lug 10 secured by means of screws and nuts 11. As will be seen from FIGS. 1 and 2, the lower arms of the side plates project above the lugs 9 and 10, so as to be engageable in the beforementioned teeth of the bar 100. The left-hand side face of the spacing block 3 is formed as a comb to accommodate eight slidable stop plates 12 (FIGS. 1 and 2), which are urged downwardly by springs 13 (FIGS. 2 and 3) to a position determined by the engagement of lugs 14 (FIG. 2), on said plates, with the lower edge of an opening in the left side plate 2.

Similarly, the right-hand side face of the spacing block 3 is channeled to accommodate two further slidable stop plates 15 (FIG. 1), also urged downwardly by springs 13 (FIG. 3) and located by the cooperation of lugs 16 with the lower edge of an opening in the right side plate 1. The stop plates 12 and 15 each controls the functions of related ones of ten totalizers (not shown) with which the subject machine is equipped, by way of example only. Obviously, a lesser or greater number of totalizers may be provided for. For such control purposes, each of the plates 12 and 15 is provided with a foot 17, adapted to cooperate with a corresponding one of the usual set of positionable sensing fingers 104 (FIGS. 1, 2, and 3). The sensing fingers 104 are positionable in different stages of their sensing movement to control various functions of the machine, as fully explained in United States Patent 2,626,749. Eight of the sensing fingers 104 lie to the left of the common tabulated position, and two of the sensing fingers lie to the right of said tabulated position, and hence the plates 12 and 15 are correspondingly located, as is clear from observing FIG. 1.

Intermediate the two sets of comb-like channels formed in the spacing block 3, to accommodate the slidable stop plates 12 and 15 (FIGS. 1 and 2), said spacing block is formed with an upstanding approximately T-shaped section 18 (FIG. 4), which, when the block 3 is assembled to the side plates 1 and 2, forms two channels 19, each of which extends across and above the tops of the related sets of slidable stop plates 12 and 15. The front ends of the channels 19 are closed by an inserted block 20 (FIGS. 1, 2, and 4), recessed to accommodate the front ends of the side plates 1 and 2, and secured there by means of one of the screws 4. The channels 19 are each arranged to receive one of two pins or studs 21 (FIGS. 4 and 5), depending from a top plate of a U-shaped slidable selecting member 22 (FIGS. 1 to 5) adapted to slide transversely in both directions over the heads of the slidable stop plates 12 and 15, so that in any particular adjusted position of the slidable selecting member 22, one of said plates 12 or 15 will be blocked by one of the pins 21 against upward movement, as will be explained later.

As will best be seen from FIG. 3, the slidable selecting member 22 closely embraces the top and the sides of the function control device and is maintained in this position and guided in its transverse movements by means of a pair of anchor plates 23 (FIGS. 1 to 4), each having a pair of studs 24, projecting through corresponding holes in the sides of the slidable selecting member 22, and into a pair of horizontal slots (FIGS. 1 and 2) formed in the upper part of the side plates 1 and 2. Each anchor plate 23 is secured to a side of the slidable selecting member 22 by a corresponding screw 26. Projecting upwardly from the top face of the selecting member 22 (FIGS. 1 to 5) is a large adjusting stud 27, having a knurled head to form a convenient fingerpiece for manipulating said selecting member. The adjusting stud 27 has a central bore to receive a spring 28 (FIG. 3) and a ball 29, which ball is forced downwardly by said spring into cooperative engagement with one of a series of dimples or indentations 30 (FIG. 4) formed at proper intervals in the top surface of the central section 18 of the spacing block 3.

The adjustment of the slidable selecting member 22, so that one or the other of the pins 21 (FIGS. 4 and 5) obstructs upward movement of its corresponding slidable stop plates 12 and 15, determines the control to be exercised over the functions of the totalizers, as will be referred to later herein. The lengths of the channels 19 and the disposition of the pins 21 are such that one pin 21 limits traverse of the selecting member 22 in one direction and the other pin 21 limits the traverse of said selecting member 22 in the other direction, and so that only one of the plates 12 or 15 will be blocked against upward movement at any particular position of adjustment of said selecting member 22. In order to facilitate the adjustment of the slidable selecting member 22, the top face of the section 18 (FIG. 4) of the spacing block 3 is engraved with the numbers of the totalizers to be selected, while the top edges of the side plates 1 and 2 are engraved with alining marks with which a beveled forward edge of the top portion of the slidable selecting member 22 is adapted to be alined for the selection of the corresponding selected totalizer.

OPERATION OF PREFERRED FORM

The carriage control device of the preferred form is slid onto the program bar 100 (FIGS. 2 and 3) of the traveling carriage 102 in the selected columnar position thereof, where it is automatically secured in position by means of the spring-pressed ball 7 in cooperation with the depression in the top surface of said bar 100. When the traveling carriage 102 tabulates into the columnar position in which the function control device is located, said carriage then comes to rest with the control plates 12 and 15 properly positioned directly above the corresponding sensing fingers 104. The operator then grasps the adjusting stud 27 (FIGS. 1, 2, and 3) and moves the slidable selecting member 22 in one or the other direction until the front beveled edge thereof is alined with the appropriate totalizer number engraved in the section 18 (FIG. 4) of the spacing block 3, where said member is retained by engagement of the spring-pressed ball 29 with one of the dimples 30.

The machine is then released for operation by depression of one of the usual motor bars, and during machine operation the sensing fingers 104 will be simultaneously elevated to sense the feet 17 of the plates 12 and 15. At this time, only the sensing finger 104, whose associated plate 12 or 15 is blocked against upward movement by one of the studs 21, will be arrested in total-taking position, and all of the remaining sensing fingers will rise fully to non-adding position, simultaneously displacing their unobstructed plates 12 and 15.

During this operation of the machine, a total will be taken from the totalizer selected by prior adjustment of the selecting member 22, while the remaining totalizers remain in non-adding position.

At the end of the first machine operation, the selecting slide 22 is again adjusted to select the second totalizer, and a machine operation is initiated to cause the second totalizer to be totalized in the manner explained above. This procedure may be repeated until all of the totalizers have been totalized. As the sensing fingers 104 return downwardly, at the end of each machine operation, the displaced plates 12 and 15 are returned downwardly under influence of the springs 13.

MODIFIED FORM

FIGS. 6, 7, and 8 disclose a modified form of function control device, in which the slideable selecting member 22 of the preferred form is replaced with a rockable segmental selecting plate 38.

Instead of the spring-urged ball 7 (FIG. 1) of the preferred form, the modified form is provided with a spring-urged half-round stud 35, which is freely mounted in a vertical boring in the rear, upper portion of the spacing block 3, and has connected thereto a properly-formed operating handle 36 projecting through and guided by a vertical slot 37 (FIG. 6) in the plate 2. The stud 35 projects downwardly through the lower surface of the block 3 and extends into the upper part of the U-shaped cut-out 5, so as to form a manually-adjustable means for clamping the function control member to the program bar 100.

The segmental selecting plate 38 is rotatably mounted on the upper surface of the block 3 (FIGS. 6, 7, and 8) near its rearward end, by means of a screw stud 39 threaded into said block. The selecting plate 38 has secured therein a series of selecting pins or studs 40, which depend from said plate so as to coact with the upper ends of the stop plates 12, and said segment 38 likewise has secured therein two selecting studs 41 arranged to coact with the upper ends of the two stop plates 15. Similar cut-away portions 42 in the upper ends of the side plates 1 and 2 provide clearance for the pins 40 and 41, as the selecting plate 38 is rotated to position said pins in relation to their corresponding stop plates 12 and 15. Cut in the lower face of the plates 38 near its forward edge is a series of dimples 43 corresponding to the pins 40 and 41, said dimples arranged to be engaged by a spring-pressed ball 44 mounted in a boring in the top surface of the block 3, to retain said selecting plate 38 in any of its various selected positions and thus to maintain the proper pin 40 or 41 in the path of the corresponding stop plates 12 or 15.

Bent upwardly from the selecting plate 38, and at right angles thereto, is a fingerpiece 45, by means of which said plate may be rotated on the screw stud 39 to position the pins 40 and 41 in relation to the stop plates 12 and 15.

OPERATION OF MODIFIED FORM

In order that the modified form of function control device may be readily slid upon the program bar 100 in the proper columnar position, the handle 36 (FIG. 6) is manually moved upwardly, so that the depending stud 35 is clear of said bar 100. When the function control device has been slid fully onto the bar 100, the handle 36 is released, whereupon the spring-urged stud 35 descends into the channel of said bar 100 to hold the device securely against forward or backward movements. The segmental selecting plate 38 is next manually adjusted, by means of the fingerpiece 45, until the proper one of a series of lines (not shown) along the forward arcuate edge thereof, corresponding to the first totalizer to be selected for total-taking, for example, coincides with a line (not shown) engraved on the forward face of the spacing block 3. The plate 38 is yieldingly retained in selected position by means of the ball 44 in cooperation with the corresponding dimple 43 (FIG. 7).

The machine may now be released for operation by depression of one of the usual starting bars, disclosed in the beforementioned United States patents, and, during operation of the machine, the sensing fingers 104 (FIG. 7) sense the feet of the stop plates 12 and 15. At this time, only the sensing finger 104, whose stop plate 12 or 15 is blocked against upward movement by one of the studs 40 or 41, will be arrested and retained in total-taking position, while all of the remaining sensing fingers 104 will rise fully to a non-adding position, simultaneously displacing their corresponding unobstructed plates 12 and 15.

During this machine operation, a total will be taken from the totalizer selected by the prior adjustment of the selecting plate 38, and said total will be printed, while none of the remaining totalizers will be brought into the engaged position but will remain in non-adding position.

When the operation has been completed, the selecting plate 38 may be adjusted to select the second totalizer, and in the ensuing machine operation the selected totalizer will be totalized and the total recorded, as in the preceding operation. This procedure may be repeated until all the totalizers have been totalized and the totals therein printed upon the record material.

The stop plates 12 and 15 are arranged in the modified form so that they will slide freely downwardly under influence of gravity when the sensing fingers 104 are returned during each machine operation. If desired, said stop plates may be provided with springs, as in the preferred form, to assist in returning them to their downward position.

In earlier machines of the same general type, as disclosed in the United States patent referred to hereinbefore, instead of the fingers 104 sensing for the stop plates 12 and 15, said fingers or their equivalents were depressed by said stop plates as the traveling carriage moved into predetermined columnar positions. If desired, the stop plates 12 and 15 of both forms may be arranged for this type of operation by forming angular camming surfaces on the soles of the feet 17. In this case, the stop plate, blocked by the pins 21 and 40 or 41, would depress the corresponding finger 104, as the traveling carriage moves into columnar position, to select and condition the corresponding totalizer for a total-taking operation in the usual and well-known manner.

While the forms of mechanisms shown and described herein are admirably adapted to fulfill the objects primarily stated, it is to be understood that it is not intended to confine the invention to the one form or embodiment disclosed herein, for it is susceptible of embodiment in various other forms, all coming within the spirit and scope of the invention.

What is claimed is:

1. A function control device constructed and arranged to be detachably mounted in any selected columnar position on the traveling carriage of an accounting machine, said accounting machine having means, including sensing fingers positionable to control the various functions thereof, said device comprising in combination a framework; a function control plate for each sensing finger, said plates freely mounted in the framework, and displaceable by the sensing fingers during positioning movement thereof; and manually operable means mounted on the framework and adjustable to coact with any selected control plate to limit movement of said control plate and the corresponding sensing finger to control the machine for a corresponding function.

2. In a machine of the class described, having a traveling carriage, movable to various columnar positions, said machine capable of performing various functions and having means including a plurality of sensing fingers positionable to control the various functions, the combination of a framework detachably mounted in any selected columnar position on the traveling carriage; a plurality of displaceable control plates mounted in the framework and displaceable by the sensing fingers upon positioning movement of said fingers; a manually adjustable member mounted on the framework; and projections on the member coacting with any desired one of the control plates, depending upon the adjustment of said member, to limit the displacement of said control plate by the corresponding sensing finger to position said finger accordingly to control the machine for a corresponding function.

3. In a machine of the class described, capable of various functions, and having means, including sensing elements positionable to control said functions, said machine also having a traveling carriage, movable to various columnar positions, the combination of a function control device, arranged to be detachably mounted in any desired columnar position on the traveling carriage, said device comprising, in combination, a framework; control plates corresponding to the sensing elements and mounted in the framework so as to be displaceable by said sensing elements during positioning movement of said elements; a rockable member mounted on the framework; and a projection on the rockable member for each control plate, and effective upon proper adjustment of the member to control the extent of displacement of the corresponding control plate to position the corresponding sensing element accordingly to control the machine for a corresponding function.

4. In a machine of the class described, capable of various functions, and having means including sensing fingers positionable to control said functions, said machine also having a traveling carriage movable to various columnar positions, the combination of a framework arranged to be detachably mounted in any selected columnar position on the traveling carriage; a control plate for each sensing finger displaceably mounted in the framework, said control plates displaceable by the corresponding sensing fingers during positioning thereof; a manually operable slide mounted on the framework; and projections on the slide arranged to cooperate with any selected control plate upon proper adjustment of said slide to control the extent of displacement of said selected control plate and the corresponding sensing finger to control the machine for a corresponding function.

5. In a machine of the class described, capable of various functions and having means including two rows of sensing fingers positionable to control said functions, said machine also having a traveling carriage movable to various columnar positions, the combination of a framework arranged to be detachably mounted in any selected columnar position on the traveling carriage; two rows of control plates movably mounted in the framework so as to overlie the two rows of sensing fingers, said control plates movable by the corresponding sensing fingers during positioning of said fingers; a manually adjustable slide mounted on the framework; and a projection on the slide for each row of control plates, said projections arranged to be positioned by adjustment of the slide, above and in the path of any selected control plate of their respective rows to limit the movement of said selected control plate and the corresponding sensing finger to control the machine for a corresponding function.

References Cited in the file of this patent
UNITED STATES PATENTS

| | | |
|---|---|---|
| 2,254,765 | Anderson | Sept. 2, 1941 |
| 2,612,315 | Anderson | Sept. 30, 1952 |
| 2,727,681 | Bogert | Dec. 20, 1955 |
| 2,927,728 | Christian et al. | Mar. 8, 1960 |